United States Patent [19]

Ohta

[11] Patent Number: 5,719,627
[45] Date of Patent: Feb. 17, 1998

[54] SYSTEM AND METHOD FOR MOTION COMPENSATION ON SUB-BAND REPRESENTED SIGNALS OF MOTION PICTURE

[75] Inventor: Mutsumi Ohta, Tokyo, Japan

[73] Assignee: NEC Corporation, Tokyo, Japan

[21] Appl. No.: 613,764

[22] Filed: Feb. 28, 1996

[30] Foreign Application Priority Data

Feb. 28, 1995 [JP] Japan ................... 7-039528

[51] Int. Cl.⁶ .................................................. H04N 7/32
[52] U.S. Cl. ...................... 348/398; 348/416; 348/413
[58] Field of Search .................................. 348/398, 397, 348/416, 405, 392, 699, 391, 402, 407, 413; 386/27, 33, 101, 109; 382/232, 190, 246, 234, 245, 253, 250; H04N 7/32

[56] References Cited

U.S. PATENT DOCUMENTS

| | | | |
|---|---|---|---|
| 4,943,855 | 7/1990 | Bheda et al. | 348/398 |
| 4,969,040 | 11/1990 | Gharavi | 348/398 |
| 5,047,838 | 9/1991 | Murakami et al. | 348/398 |
| 5,067,015 | 11/1991 | Combridge et al. | 348/398 |
| 5,097,331 | 3/1992 | Chen et al. | 348/398 |
| 5,107,348 | 4/1992 | Citta et al. | 348/398 |
| 5,128,757 | 7/1992 | Citta et al. | 348/398 |
| 5,202,760 | 4/1993 | Tourtier et al. | 348/398 |
| 5,216,719 | 6/1993 | Oh | 348/398 |
| 5,311,310 | 5/1994 | Jozawa et al. | 348/416 |
| 5,313,298 | 5/1994 | Meeker | 348/405 |
| 5,335,071 | 8/1994 | Shin | 348/392 |
| 5,337,085 | 8/1994 | Lee et al. | 348/398 |
| 5,384,869 | 1/1995 | Wilkinson et al. | 348/398 |
| 5,406,328 | 4/1995 | Chodos et al. | 348/169 |
| 5,446,495 | 8/1995 | Tourtier et al. | 348/398 |
| 5,469,517 | 11/1995 | Ohta | 348/398 |
| 5,481,308 | 1/1996 | Hartung et al. | 348/398 |
| 5,543,845 | 8/1996 | Asamura et al. | 348/398 |

FOREIGN PATENT DOCUMENTS 5-199507  8/1993  Japan.

OTHER PUBLICATIONS

"Scalable Video Coding Using 3-D Subband Velocity Coding and Multirate Quantization", Chang et al, IEEE, pp. 574–577, Apr. 1993.

"Subband Video Coding Using Edge Information", Eryurtlu et al, IEEE, pp. 1–6, 1993.

"Image Subband Coding with Interband Predictions", Lin et al, IEEE, pp. 410–413, 1993.

"Motion compensated Subband Coding Schemes for Compatible High Definition TV Coding", Tourtier et al, IEEE, pp. 325–344, Aug. 1992.

Primary Examiner—Tommy P. Chin
Assistant Examiner—Vu Le
Attorney, Agent, or Firm—Foley & Lardner

[57] ABSTRACT

For digital signals provided with motion vectors of a plurality of regions, a conversion coefficient for a respective one of the motion vectors is determined in accordance with the respective motion vector and a shape of a corresponding one of the regions on which the respective motion vector represents a motion, linear conversions of the digital signals are performed by using the respective coefficients of the motion vectors, and an accumulation is made of results of the conversions for the respective motion vector by the linear conversion step so that the linear conversions are overlapped with each other.

5 Claims, 11 Drawing Sheets

SYSTEM AND METHOD FOR MOTION COMPENSATION ON SUB-BAND REPRESENTED SIGNALS OF MOTION PICTURE

BACKGROUND OF THE INVENTION

The present invention generally relates to a motion compensation system and a motion compensation method, and particularly, to a system and a method for a motion compensation of sub-band represented signals of a motion picture.

DESCRIPTION OF THE RELATED ART

Recent years have observed an increasing need for a system and a method for motion-compensating sub-band represented signals such as on spatiotemporal picture data or temporal acoustic data to implement an efficient data-compression coding, permitting a wide range of applications, such as to a resolution, variable representation for example.

For such a system and a method, it has been concluded that the motion compensation on divided bands of a motion picture renders a coding efficiency lower than that on a full-band, without a quantitative estimation.

This point will be discussed below with respect to a one-dimensional signal for a facilitated comprehension, as it will be easy for the artisan to expand an employed principle for a discussion on a multi-dimensional signal.

FIG. 1 is an illustrative diagram of a conventional analysis-synthesis system.

This system comprises an analysis section for dividing a full-range band of a one-dimensional input signal into a total of N (an arbitrary positive integer; N=4 in the figure) sub-bands to convert the input signal from a spatial representation to a sub-band representation for a desired analysis, and a synthesis section for synthesizing a total of N sub-band signals to output a reconstructed signal to achieve an inverse conversion from a sub-band representation to a spatial representation.

The analysis section comprises a total of N sub-band circuits of which a p-th one ($1 \leq p \leq N$) is composed of a p-th band pass filter 510-p for limiting the input full-band signal to one N-th and a down-sampler 520 adaptive for a thinning-out to one N-th of a sampling rate of an output of the filter 510-p.

The synthesis section comprises a total of N sub-band circuits of which a p-th one is composed of an up-sampler 580 for N-folding a sampling rate of a received sub-band signal and a p-th band pass filter 540-p for limiting a full-range band of an output of the up-sampler 580 to one N-th, and an adder 550 for accumulating outputs of the respective filters 540-p of the N sub-band circuits.

Assuming N=2 for a simple description, letting i be an arbitrary integer, a series of pixel-level samples x(i) of the input signal are converted by an analysis oriented low-pass filter h (as an impulse response function of a convolution variable k) into a series of sub-band signals $x_L(i)$ such that:

$$x_L(i) = \sum_k x(2i-k)h(k), \qquad (1)$$

and by an analysis oriented high-pass filter g (as a function) into a series of sub-band signals $x_H(i)$ such that:

$$x_H(i) = \sum_k x(2i-k)g(k). \qquad (2)$$

Likewise, sub-band signals $x_L(i)$ and $x_H(i)$ are inverse-converted by synthesis oriented low-pass and high-pass filters h' and g' (as functions) and accumulated to provide a series of pixel-level samples x'(i) of the reconstructed signal, such that:

$$x'(i) = \sum_k x_L(k)h'(2k-i) + \sum_k x_H(k)g'(2k-i). \qquad (3)$$

Such a sub-band representation has already been employed for a motion-compensated inter-frame prediction coding. For example, in a case of a television signal, such a prediction coding is performed every sub-band. In general, the division into sub-bands is advantageous in data compression coding and resolution variable representation.

FIG. 2 is a block diagram of part of a conventional motion-compensated inter-frame prediction coding system.

In the system of FIG. 2, a motion vector of an input signal is estimated by a motion vector estimator 620, before the input signal is input to a divider 610, where it is divided into a plurality of sub-bands so that a respective sub-band signal is input to a corresponding inter-frame prediction circuit 630-q, where it is motion-compensated by using the motion vector, as it is distributed thereto. Designated at reference character MC is a circuit for the motion-compensated inter-frame prediction.

The system of FIG. 2 inherently is a device for coding an inter-frame difference signal, in which an input picture in a current frame is split into a number of blocks to estimate an image motion of each block relative to a corresponding region of a reference picture representative of an input picture in a previous frame and in which the reference picture is motion-compensated in accordance with the estimated motion to provide a motion-compensated picture as a prediction picture of the current input picture for a calculation to determine a difference between the prediction picture and the current picture, before a representative signal of the difference is coded.

FIG. 3 illustrates a concept of such a conventional block-level motion compensation.

In FIG. 3, a reference picture includes a number of square regions, such as PR1 to PR4, of which a respective one (e.g. PR1) corresponds to a certain split block (e.g. at a first row, first column of a 4×6 block matrix) of an unshown current input picture and has a motion vector estimated relative thereto.

The respective region (e.g. PR1) is cut out from the reference picture and moved in accordance with the estimated vector, as a piece to patch a corresponding block (e.g. B1 at (1,1)) of an MC (motion-compensated) picture consisting of a matrix of 4×6 blocks.

The MC picture is an imaginary editorial picture on which motion-compensated regions are merged by a mapping, so it may overlap on the reference picture.

Therefore, if the motion vector has a value thereof defined to be employed with an accuracy in terms of an integral number of pixel pitches, the motion compensation is a simple pixel-shift operation so that each MC circuit of FIG. 2 may comprise a delay circuit for a variable delay in unit of one frame. In a case where the value of motion vector is significant in terms of a fraction of a pixel pitch, the MC circuit may further comprise an inter-pixel interpolation circuit.

FIG. 4 illustrates a concept of a conventional motion compensation in which blocks overlap each other.

In FIG. 4, each split block is expanded in an overlapping manner so that a corresponding region (e.g. PR1' expanded from PR1) overlaps neighboring regions in a reference picture, as well as a motion-compensated patch piece (B1' expanded from B1 at (2,2)) overlapping neighboring pieces in an MC picture, whereas each piece (e.g. PR1') cut out from the reference picture is subjected to a window function w that attenuates along a peripheral region.

The foregoing MC (motion compensation) by blocks may be arithmetically expressed.

A reference picture has a number of reference blocks of an N-pixel size each corresponding to one of split blocks of a current picture, so that a pixel signal x(i) of a j-th reference block ($jN \leq i \leq jN+N-1$) is shiftable for a block MC by a calculatable operator m as a function of a combination of the pixel number i, the block number j as a convolution variable, and a value of a motion vector estimated of a concerned reference block.

It is now assumed that a 0-th block ($0 \leq i \leq N-1$) is concerned. Letting $v_0$ be the value of the motion vector of the 0-th block, a complete MC thereof can be generally expressed as a sum taken for all blocks, such that:

$$\sum_j m(i,j,v_0)x(j). \qquad (4)$$

In the simplest case in which a shift occurs in blocks, it so follows that:

$$\begin{aligned} m(i,j,v_0) &= \delta(i-j-v_0) \quad \text{for } 0 \leq i \leq N-1, \\ &= 0 \quad \text{for other } i \end{aligned} \qquad (5)$$

In the case of an overlap MC, assuming a two-fold expansion of each block subject to a window function w(i), it so follows that:

$$\begin{aligned} m(i,j,v_0) &= w(i)\delta(i-j-v_0) \quad \text{for } (-N/2) \leq i \leq (3N/2)-1 \\ &= 0 \quad \text{for other } i \end{aligned} \qquad (6)$$

In the case of a fractional pel (picture element) accuracy MC, letting fvo(i) be an interpolation filter, it so follows that:

$$\begin{aligned} m(i,j,v_0) &= f_{v0}(i-j) \quad \text{for } 0 \leq i \leq N-1, \\ &= 0 \quad \text{for other } i \end{aligned} \qquad (7)$$

In each case, the sum $\Sigma$ is taken of the respective blocks.

When an arbitrary set of blocks is concerned, letting V be a set of associated motion vectors such that:

$$V = \{v_n | n \in Z \text{ (a total set of integers)}\},$$

an input signal x(i) will thus be motion-compensated to y(i) such that:

$$y(i) = \sum_n \left\{ \sum_j m(i-nN, j-nN, v_n)x(j) \right\}. \qquad (8)$$

In general, the motion picture prediction by such the motion compensation contributes to a high efficient coding. However, if it is effected on sub-band signals, a resultant efficiency has not been so high as on a full-band.

To overcome such a deficiency, a favorable implementation has already been proposed in the Japanese Patent Application Laid-Open Publication No. 5-199507, in which a motion picture coding system includes a shift calculation circuit for calculating a motion compensation MC on sub-band signals by making use of an advantageous motion compensation S on a full-band, such that:

$$MC = TST^{-1},$$

where $T^{-1}$ is a transformation from a sub-band representation to a full-band representation and T is a transformation from a full-band representation to a sub-band representation.

This concept may be generalized as illustrated in FIG. 5A, for the motion compensation S may be considered as a shift operation in a spatial representation.

In this respect, the conventional motion picture coding system of concern has a constitution shown by a block diagram in FIG. 5B.

The system of FIG. 5B comprises a $T^{-1}$ transformation section composed of a pair of linear operators $A^L$ and $A^H$ and an accumulator 840, an S (shift) operator, and a T transformation section composed of a pair of linear operators $A_L$ and $A_H$.

The linear operator $A^L$ comprises an up-sampler 810 and a synthesize oriented low-pass filter 820 with a function h'. The linear operator $A^H$ comprises another up-sampler 810 and a synthesize oriented high-pass filter 830 with a function g'. The linear operator $A_L$ comprises an analysis oriented low-pass filter 860 with a function h and a down-sampler 880. The linear operator $A_H$ comprises an analysis oriented high-pass filter 870 with a function g and another down-sampler 880.

FIG. 6 shows an equivalent block diagram to the diagram of FIG. 5B, as the adder 840 is displaced.

The diagram of FIG. 6 includes the following four linear operators:

$$\begin{aligned} A_L^L &= A_L \cdot S \cdot A^L \\ A_H^L &= A_H \cdot S \cdot A^L \\ A_L^H &= A_L \cdot S \cdot A^H \\ A_H^H &= A_H \cdot S \cdot A^H. \end{aligned} \qquad (9)$$

If the full-band motion compensation operator S is a pixel shift operator, the four linear operators each comprise an FIR (finite-duration impulse-response) filter.

Accordingly, two intra-subband filters $A_L^L$ and $A_H^H$ and two inter-subband cross term filters $A_L^H$ and $A_H^L$ are cooperative with each other to permit a motion compensation on sub-bands to be performed with an equivalent coding efficiency to that on a full-band.

However, the system of FIG. 5B is adapted simply for shifting pixels of a whole picture by a single motion vector, and is inapplicable to a block MC nor to an overlap MC or fractional pel accuracy MC as a developed one of the block MC.

The present invention has been achieved with such points in mind.

SUMMARY OF THE INVENTION

It therefore is an object of the present invention to provide a motion compensation system and a motion compensation method adaptive also to a block MC and the like, while permitting a motion compensation on sub-bands to be performed with a competent coding efficiency to that on a full-band.

To achieve the object, a genus of the present invention provides a system for motion-compensating a combination of a first signal defined on a first sub-band and a second signal defined on a second sub-band, the system comprising a first filter means for linearly converting to motion-compensate the first signal within the first sub-band, a second filter means for linearly converting to motion-compensate the second signal within the second sub-band, and a third filter means for linearly converting to motion-compensate the first signal from the first sub-band onto the second sub-band.

Therefore, according to this genus of the invention, a first filter means constitutes an intra-band filter for motion-compensating signal components in terms of a first sub-band, a second filter means constitutes an intra-band filter for motion-compensating signal components in terms of a second sub-band, and a third filter means constitutes an inter-band cross term filter for motion-compensating signal components that inherently should have been inverted to the second sub-band but practically are associated with the first sub-band due to a definite number of filter taps, thus permitting a complete motion compensation on the second sub-band.

According to a species of this genus of the invention, the system further comprises a fourth filter means for linearly converting to motion-compensate the second signal from the second sub-band onto the first sub-band.

To achieve the object, another genus of the present invention provides a system for a motion compensation on sub-band signals, the system comprising linear conversion coefficient determiner means responsible for digital signals provided with motion vectors of a plurality of regions to determine a conversion coefficient for a respective one of the motion vectors in accordance with the respective motion vector and a shape of a corresponding one of the regions on which the respective motion vector represents a motion, linear conversion means for performing linear conversions of the digital signals by using the respective coefficients of the motion vectors, and accumulation means for accumulating results of the conversions for the respective motion vector by the linear conversion means so that the linear conversions are overlapped with each other.

Therefore, according to this genus of the invention, for digital signals provided with motion vectors of a plurality of regions, a conversion coefficient is determined for a respective one of the motion vectors in accordance with the respective motion vector and a shape of a corresponding one of the regions on which the respective motion vector represents a motion, linear conversions of the digital signals are performed by using the respective coefficients of the motion vectors, and results of the linear conversions are accumulated, permitting a motion compensation on sub-band signals to be equivalent to that on a full-band.

To achieve the object, another genus of the present invention provides a system for a motion compensation on sub-band signals, the system comprising first linear conversion coefficient determiner means responsible for digital signals provided with motion vectors of a plurality of regions and divided into a total of N sub-bands, where N is an integer larger than one, to determine a conversion coefficient in a respective one of the N sub-bands for a respective one of the motion vectors and a signal on the respective sub-band in accordance with the respective motion vector and a shape of a corresponding one of the regions on which the respective motion vector represents a motion, second linear conversion coefficient determiner means for determining conversion coefficients between sub-bands for a total of N−1 sub-band signals different from the signal on the respective sub-bands in accordance with the respective motion vector and the shape of the corresponding region on which the respective motion vector represents the motion, for the respective motion vector and the signal on the respective sub-band, first linear conversion means for performing an intra-band linear conversion by the conversion coefficient in the respective sub-band for the respective motion vector and the respective one of the N sub-bands, second linear conversion means for performing inter-band linear conversions by the conversion coefficients between the N-1 sub-bands for the respective motion vector and the respective one of the N sub-bands, and accumulation means for accumulating a result of the intra-band linear conversion of the first linear conversion means and results of the inter-band linear conversions of the second linear conversion means.

Therefore, according to this genus of the invention, for digital signals provided with motion vectors of a plurality of regions and divided into a total of N sub-bands, a conversion coefficient in a respective one of the N sub-bands is determined for a respective one of the motion vectors and a signal on the respective sub-band in accordance with the respective motion vector and a shape of a corresponding one of the regions on which the respective motion vector represents a motion, conversion coefficients between sub-bands are determined for a total of N−1 sub-band signals different from the signal on the respective sub-bands in accordance with the respective motion vector and the shape of the corresponding region on which the respective motion vector represents the motion, for the respective motion vector and the signal on the respective sub-band, an intra-band linear conversion is performed by the conversion coefficient in the respective sub-band for the respective motion vector and the respective one of the N sub-bands, inter-band linear conversions are performed by the conversion coefficients between the N−1 sub-bands for the respective motion vector and the respective one of the N sub-bands, and an accumulation is performed of a result of the intra-band linear conversion and results of the inter-band linear conversions, permitting a motion compensation on sub-band signals to be equivalent to that on a full-band, with an increased accuracy.

According to a species of this genus of the invention, an accumulation of a predetermined one of the results of the inter-band linear conversions of the second linear conversion means is omitted.

Further, to achieve the object, another genus of the present invention provides a method for motion-compensating a combination of a first signal defined on a first sub-band and a second signal defined on a second sub-band, the method comprising the steps of linearly converting to motion-compensate the first signal within the first sub-band, linearly converting to motion-compensate the second signal within the second sub-band, and linearly converting to motion-compensate the first signal from the first sub-band onto the second sub-band.

According to a species of this genus of the invention, the method further comprises linearly converting to motion-compensate the second signal from the second sub-band onto the first sub-band.

To achieve the object, another genus of the present invention provides a method for a motion compensation on sub-band signals, the method comprising a linear conversion coefficient determining step of being responsible for digital signals provided with motion vectors of a plurality of regions to determine a conversion coefficient for a respective one of the motion vectors in accordance with the respective motion vector and a shape of a corresponding one of the regions on which the respective motion vector represents a motion, a linear conversion step of performing linear conversions of the digital signals by using the respective coefficients of the motion vectors, and an accumulation step of accumulating results of the conversions for the respective motion vector by the linear conversion step so that the linear conversions are overlapped with each other.

BRIEF DESCRIPTION OF THE DRAWINGS

The objects, features and advantages of the present invention will become more apparent from consideration of the following detailed description, in conjunction with the accompanying drawings, in which.

DESCRIPTION OF THE PREFERRED EMBODIMENTS

Figure 1:
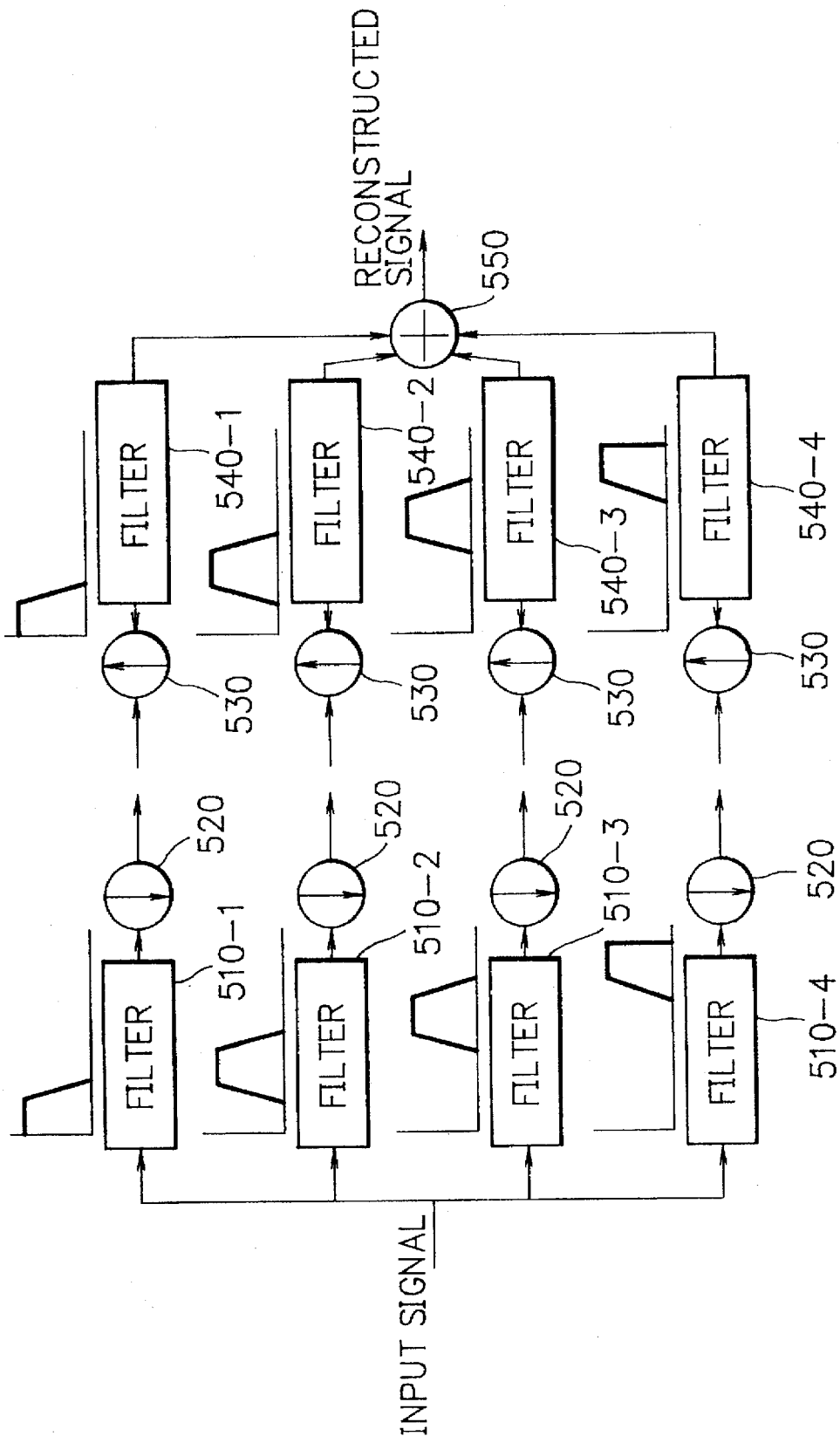
FIG. 1 is an illustrative diagram of a conventional analysis-synthesis system.
Figure 2:
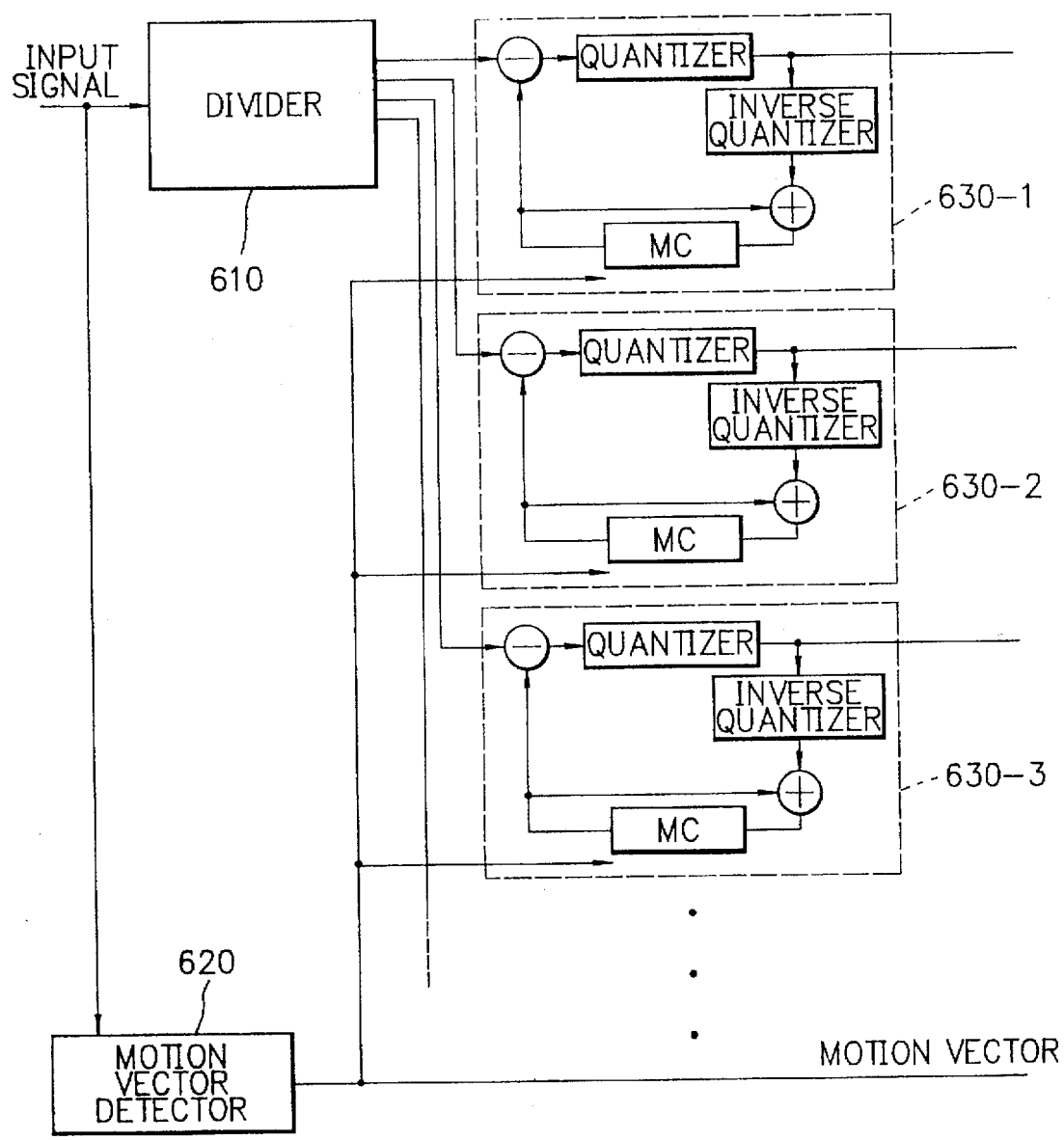
FIG. 2 is a block diagram of part of a conventional motion-compensated inter-frame prediction coding system.

There will be detailed below preferred embodiments of the present invention, with reference to the accompanying drawings. Like members are designated by like reference characters.

Figure 7:
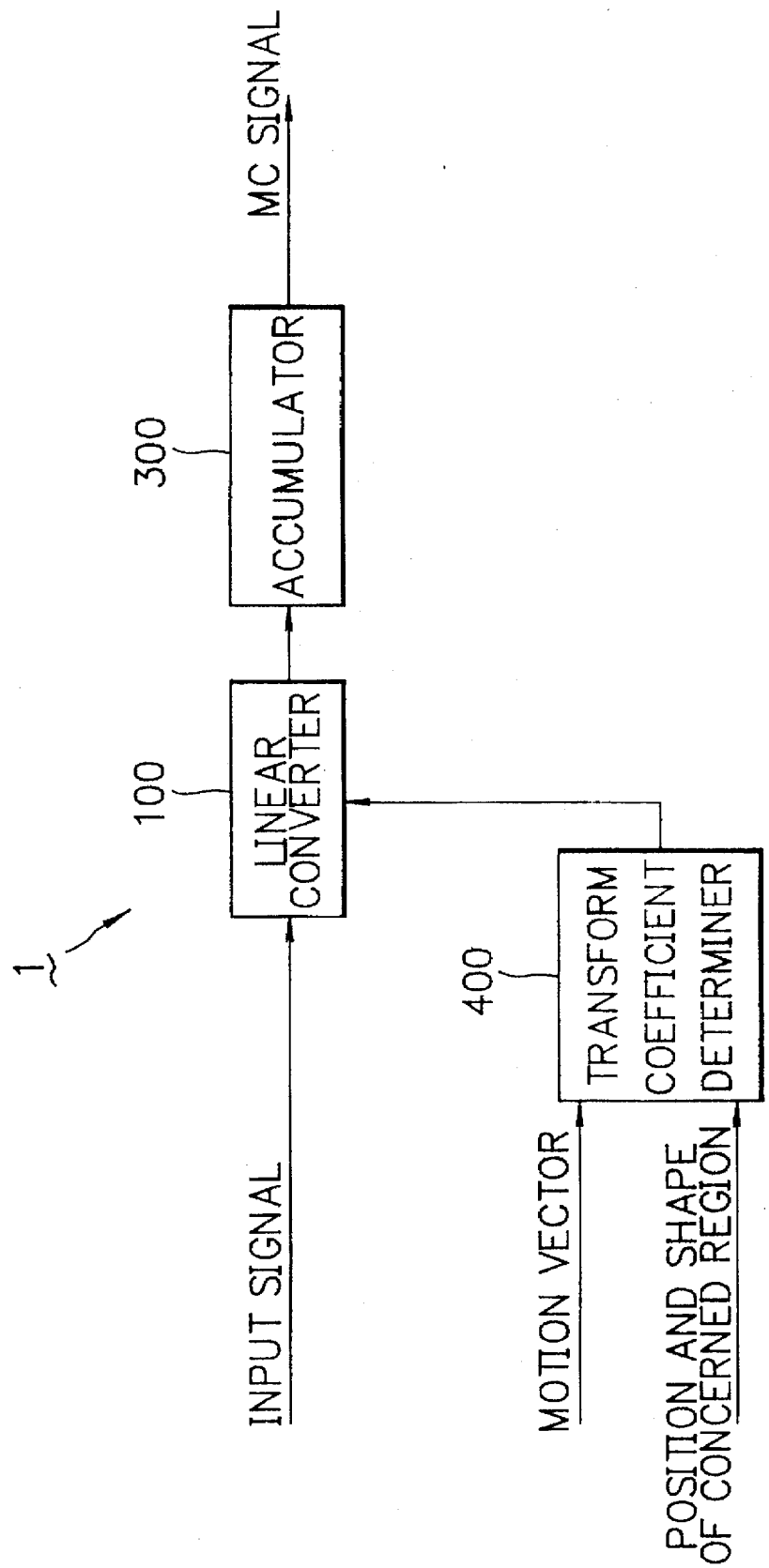
FIG. 7 is a block diagram of a sub-band motion compensation system according to an embodiment of the invention.

FIG. 7 is a block diagram of a sub-band motion compensation system 1 according to an embodiment of the invention.

The motion compensation system 1 comprises a linear converter 100 for a linear conversion of an input signal, an accumulator 300 for accumulating linearly transformed signals, and a linear conversion coefficient determiner 400 responsive to signals on a motion vector of the input signal and on a position and a shape of a concerned region to determine a coefficient for the transformation of the linear converter 100.

The input signal to the system 1 is linearly transformed at the linear converter 100, wherefor the converter 100 receives a linear conversion coefficient from the coefficient determiner 400, which coefficient is determined to effect a transformation simply in a vicinity of a concerned block.

The accumulator 300 is adapted for an addition operation and an accumulation operation. At the accumulator 300, a number of sequential results of the addition are accumulated to provide a reconstructed motion compensation signal so that linearly converted input signals are summed up in an overlapping manner.

Figure 6:
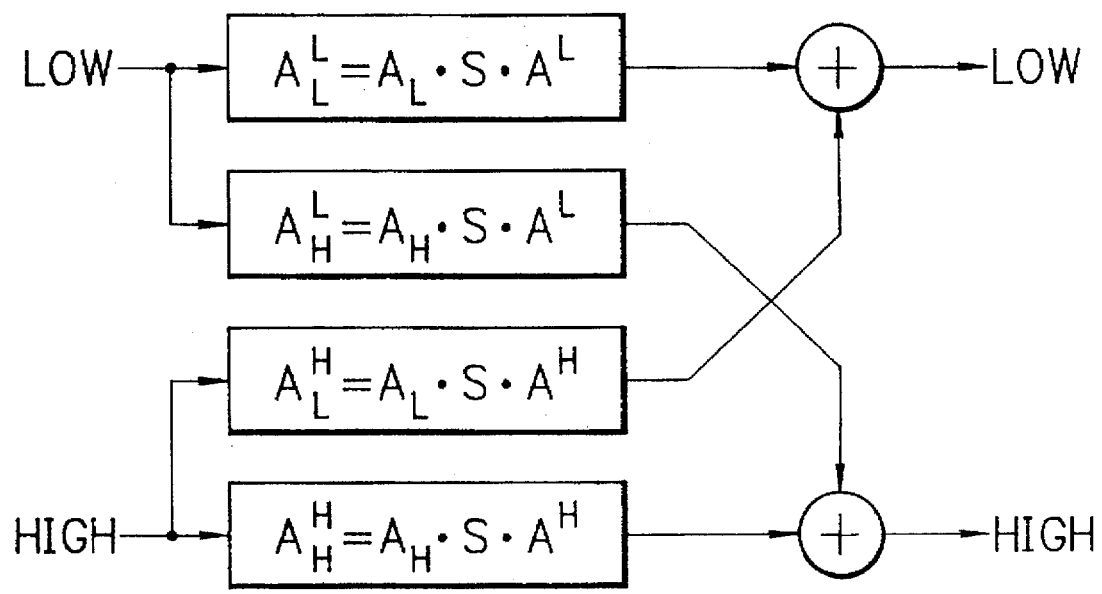
FIG. 6 is a block diagram equivalent to FIG. 5B.

The coefficient determiner 400 determines a coefficient to be employed at the linear converter 100 for a transformation to effect a motion compensation for every block. For the transformation of each block, the linear operators $A_L^L$, $A_H^H, A_L^H$ and $A_H^L$ of FIG. 6 are substituted by linear operators m, $m_H^H$, $m_L^H$ and $m_H^L$ such that:

$$m_L^L(i,j,v_n) = \sum_k \sum_l A_L(i,k) m(k,l,v_n) A^L(l,j); \quad (10)$$

$$m_L^H(i,j,v_n) = \sum_k \sum_l A_L(i,k) m(k,l,v_n) A^H(l,j); \quad (11)$$

$$m_H^L(i,j,v_n) = \sum_k \sum_l A_L(i,k) m(k,l,v_n) A^L(l,j); \quad (12)$$

and $$m_H^H(i,j,v_n) = \sum_k \sum_l A_L(i,k) m(k,l,v_n) A^H(l,j). \quad (13)$$

Accordingly, motion compensated signals $x'_L(i)$ and $x'_H(i)$ on sub-bands are calculated such that:

$$x'_L(i) = \sum_n \left\{ \sum_j m_L^L(i - nN/2, j - nM/2, v_n) x_L(j) \right\} + \sum_n \left\{ \sum_j m_L^H(i - nN/2, j - nM/2, v_n) x_H(j) \right\} \quad (14)$$

and $$x'_H(i) = \sum_n \left\{ \sum_j m_H^L(i - nN/2, j - nM/2, v_n) x_L(j) \right\} + \sum_n \left\{ \sum_j m_H^H(i - nN/2, j - nM/2, v_n) x_H(j) \right\} \quad (15)$$

Therefore, letting L be a lower sub-band and H be a higher sub-band, an MC is achieved as a superimposition of transformations defined by four routes L→H, L→H, H→L and H→H, which is apparently similar to the conventional system using FIR filters, but is different in that the linear conversion in FIG. 7 is reducible to none of conventional block MC, overlap MC and fractional pel accuracy MC, alone or in combination, which transformation will sometimes be called "generalized MC".

Figure 8A:
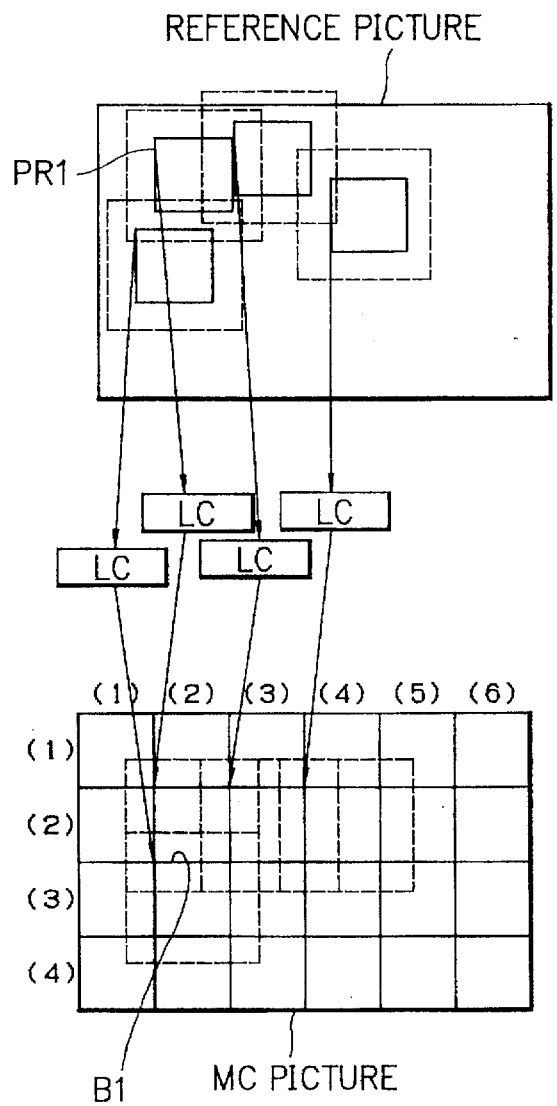
FIG. 8A is an illustration of a concept of a generalized MC according to an embodiment of the invention.
Figure 8B:
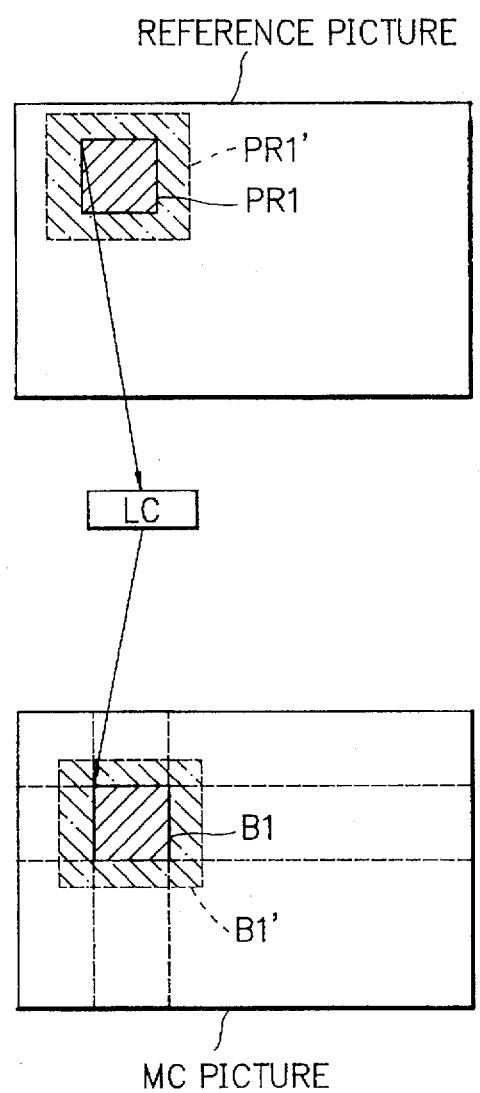
FIG. 8B is an emphasized illustration of a single concerned block of FIG. 8A.

FIG. 8A illustrates a concept of the generalized MC, and FIG. 8B is an emphasized illustration of a single concerned block of FIG. 8A.

As shown in FIG. 8B, a concerned block PR1 in a reference picture is expanded to have an integral peripheral extension PR1' that overlaps neighboring expanded blocks as in FIG. 8A.

The expanded block PR1+PR1' is linear-transformed as a concerned block B1 provided with an integral peripheral extension B1' that overlaps neighboring expanded blocks as in FIG. 8A.

Such expanded blocks are superimposed to constitute an MC picture.

The system of FIG. 7 is thus adapted for a generalized MC, in which an input signal is divided into blocks of which a respective one has a motion vector assigned thereto, and in which a generalized MC is achieved by a combination of a linear conversion means 100 for calculating a superimposition of overlapped linear conversions and a linear conversion coefficient determining means 400 for calculating to determine adequate coefficients of the linear conversions in accordance with a motion vector of each concerned block.

Figure 9:
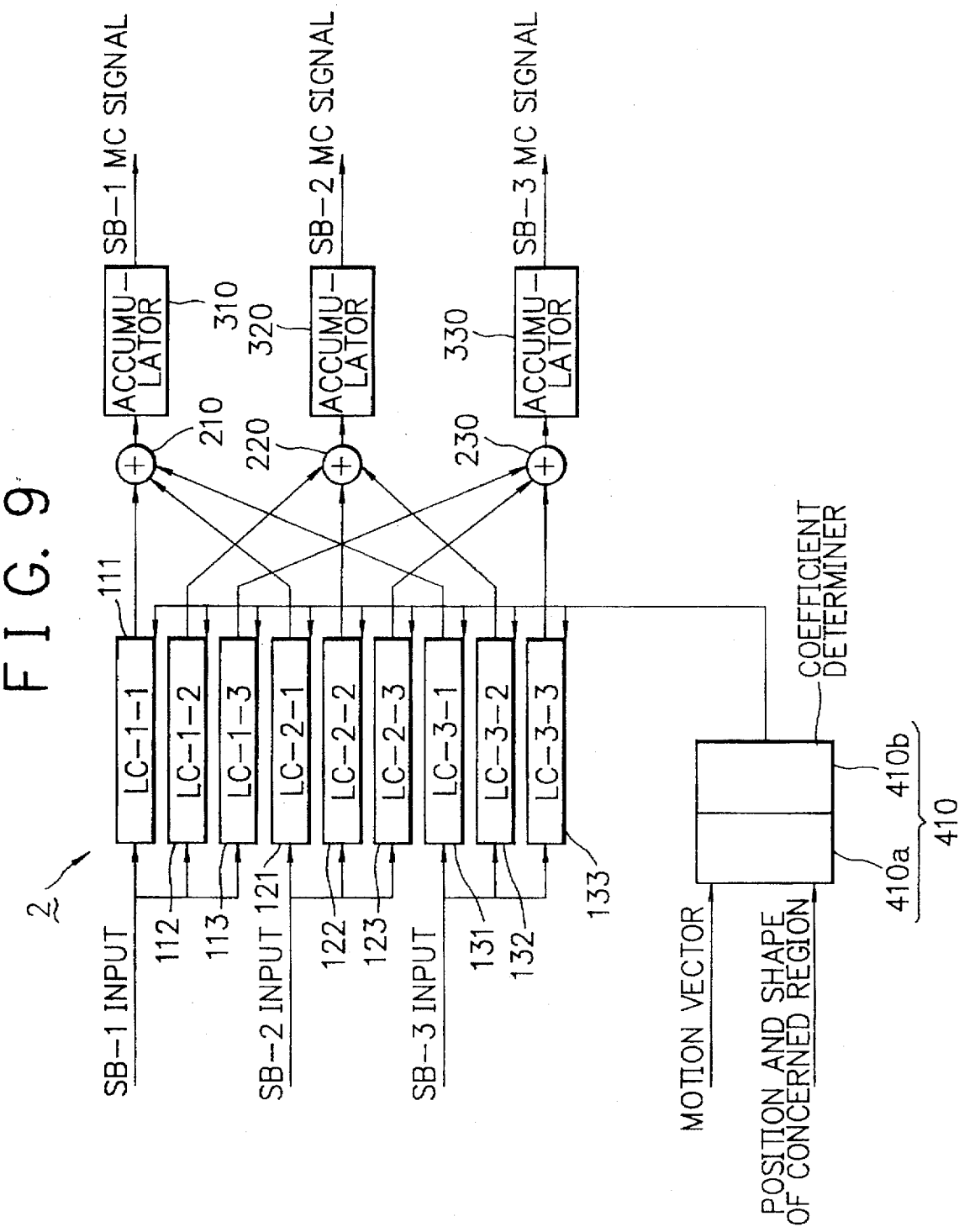
FIG. 9 is a block diagram of a system for performing a generalized MC on sub-bands according to another embodiment of the invention.

FIG. 9 is a block diagram of a system 2 for performing a generalized MC on sub-bands according to another embodiment of the invention.

In FIG. 9, the sub-bands are set to be three in number, for example. Accordingly, three sub-band signals SB-p (p=1 to 3) are input to the system 2.

The system 2 comprises a set of three linear converters 111 to 113 for linear conversions LC-1-q (q=1 to 3) of the input sub-band signal SB-1, a set of three linear converters 121 to 123 for the linear conversions LC-2-q of the input sub-band input signal SB-2, a set of three linear converters 131 to 133 for the linear conversions LC-3-q of the input sub-band input signal SB-3, a set of three adders 210, 220 and 230 for adding results of designated ones of the linear conversions LC-p-q, a set of three accumulators 310, 320 and 330 each connected to a corresponding one of the adders 210, 220 and 230 for receiving to accumulate outputs of the corresponding adder, and a single linear conversion coefficient determiner 410.

Letting N be the number of first sub-bands (to be subjected to LC-p-p [p=1 to 3]) of the input sub-bands SB-p and N' be that of second sub-bands (to be subjected to LC-p-q [p≠q]) of the input sub-bands SB-p, N<N' as N=3 and N'=2×3=6.

Linear converters 111, 122 and 133 are for intra-band conversions LC-p-p (p=1 to 3) of the first sub-bands; and linear converters 112, 113, 121, 123, 131 and 182, for inter-band cross term conversions LC-p-q (p≠q) of the second sub-bands occurring between the first sub-bands.

The input sub-band signal SB-1 is divided to be converted by the linear converters 111, 112 and 113; the input sub-band signal SB-2, by the linear converters 121, 122 and 123; and the input sub-band signal SB-3, by the linear converters 131, 182 and 183.

The adder 210 is employed for an addition of a result of one intra-band conversion LC-1-1 and respective results of two inter-band cross term conversions LC-2-1 and LC-3-1; the adder 220, for that of a result of one intra-band conversion LC-2-2 and results of two inter-band cross term conversions LC-1-2 and LC-3-2; and the adder 230, for that of a result of one intra-band conversion LC-3-3 and results of two inter-band cross term conversions LC-1-3 and LC-2-3.

The linear conversion coefficient determiner 410 is a coefficient calculator for determining conversion coefficients to be employed at the linear converters 111–113, 121–123, 131–133 for a motion compensation of each concerned block.

The coefficient determiner 410 comprises first and second linear conversion coefficient determiners 410a and 410b. The first coefficient determiner 410a serves for calculation of the linear operators $A_L$, $A_H$, and the second coefficient determiner 410b serves for that of the linear operators $A^L$, $A^H$.

The first determiner 410a may determine linear conversion coefficients for $A_L$, $A^L$, and the second determiner 410b may determine linear conversion coefficients for $A_H$, $A^H$.

Linear converted signals from three different routes are accumulated by the accumulators 310, 320 and 330 in an overlapping manner, respectively. The accumulators 310, 320 and 330 each make an accumulation of signals on one of the three first sub-bands and two of the six second sub-bands, respectively. A result of the accumulation is output from the accumulator 310, 320 or 330 as an MC signal of a corresponding sub-band SB-p.

Figure 10:
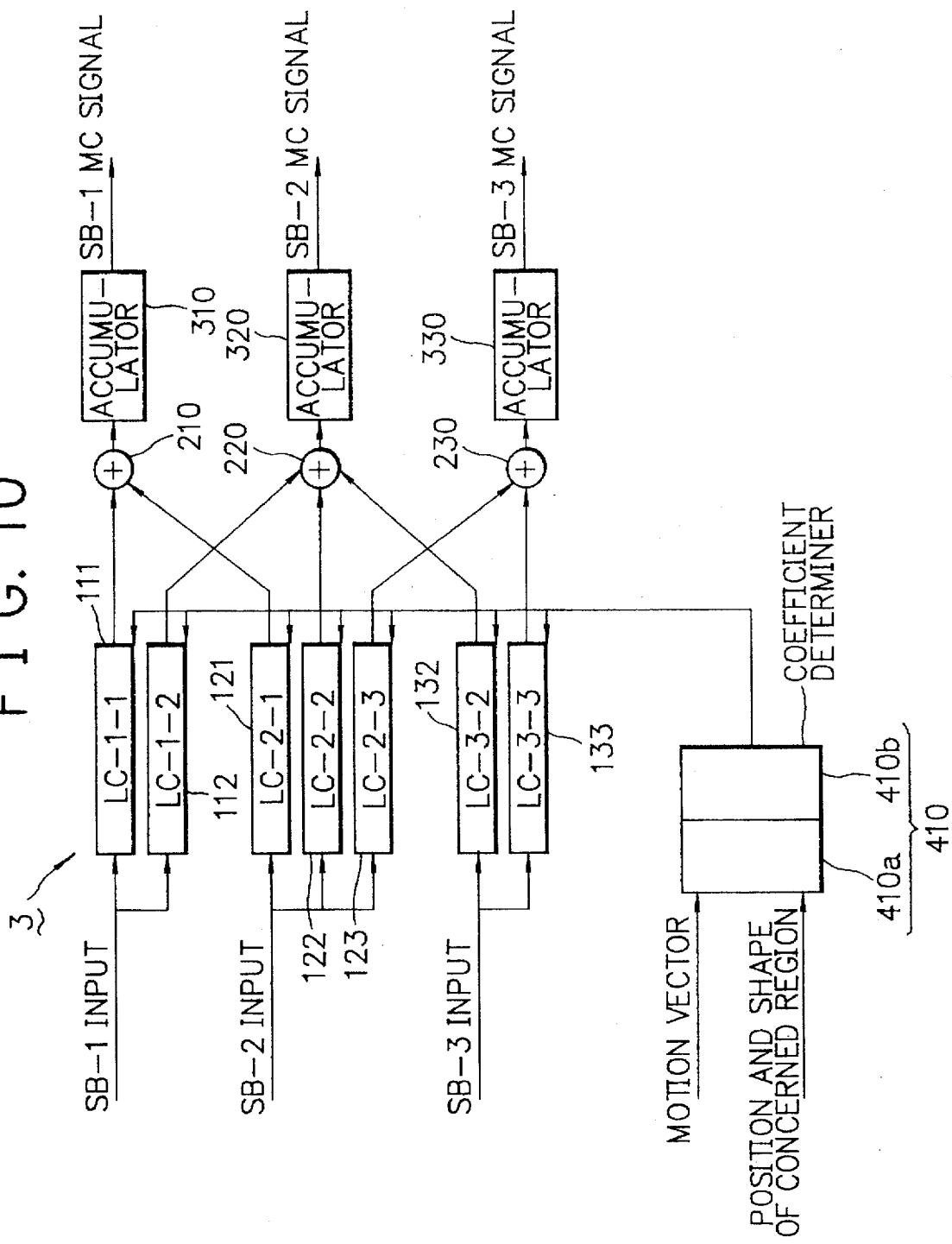
FIG. 10 is a block diagram of a system for performing a generalized MC on sub-bands according to another embodiment of the invention.

FIG. 10 is a block diagram of a system 3 for performing a generalized MC on sub-bands according to another embodiment of the invention.

This system 3 is different from the system 2 (FIG. 9) in that the linear converters 113 and 181 of the system 2 are omitted, as a cross term MC has little significance between non-neighboring sub-bands.

In the foregoing description of the preferred embodiments of the invention, priority has been given to a diagrammatic comprehension.

Some of the embodiments will be reviewed herebelow, with discussions on the theoretical sides. Like description will sometimes be made from another viewpoint.

To provide a basic concept, there will first be discussed a uniform spatial shift of an entire picture.

Figure 5A:
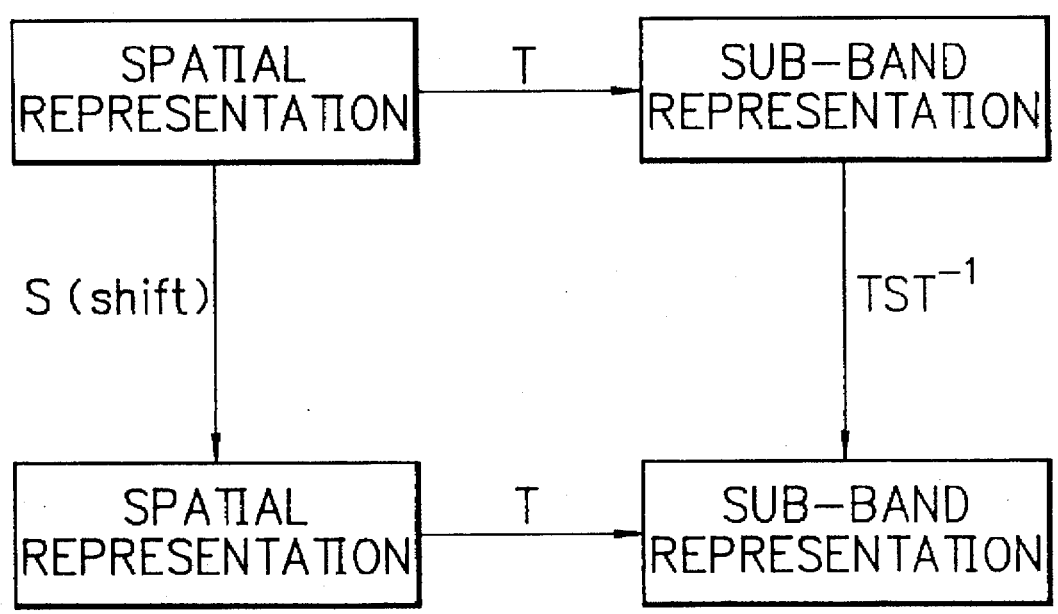
FIG. 5A is an illustration of a generalized concept of a conventional system.

FIG. 5A shows a basic concept of MC in a spatial representation and that in a sub-band representation, as they correspond to each other.

The MC in the spatial representation is a directional shift in a spatial domain. As a uniform spatial shift of an entire picture is treated of, the directional shift is a one-to-one linear conversion.

The sub-band representation is obtained by a one-to-one linear transformation of the spatial representation into a transformation coefficient domain. Accordingly, letting S be the shift operation in the spatial representation and T be the transformation from the spatial representation to the sub-band representation, a shift operation in the sub-band representation should be equivalent to:

$$T \cdot S \cdot T^{-1}, \quad (16)$$

which simply means that sub-band signals are pulled back to the spatial domain, where they have a corresponding full-band signal spatially shifted. This relationship will be expressed in terms of sub-band representation.

A most simple two-division sub-band representation is now considered.

Figure 5B:
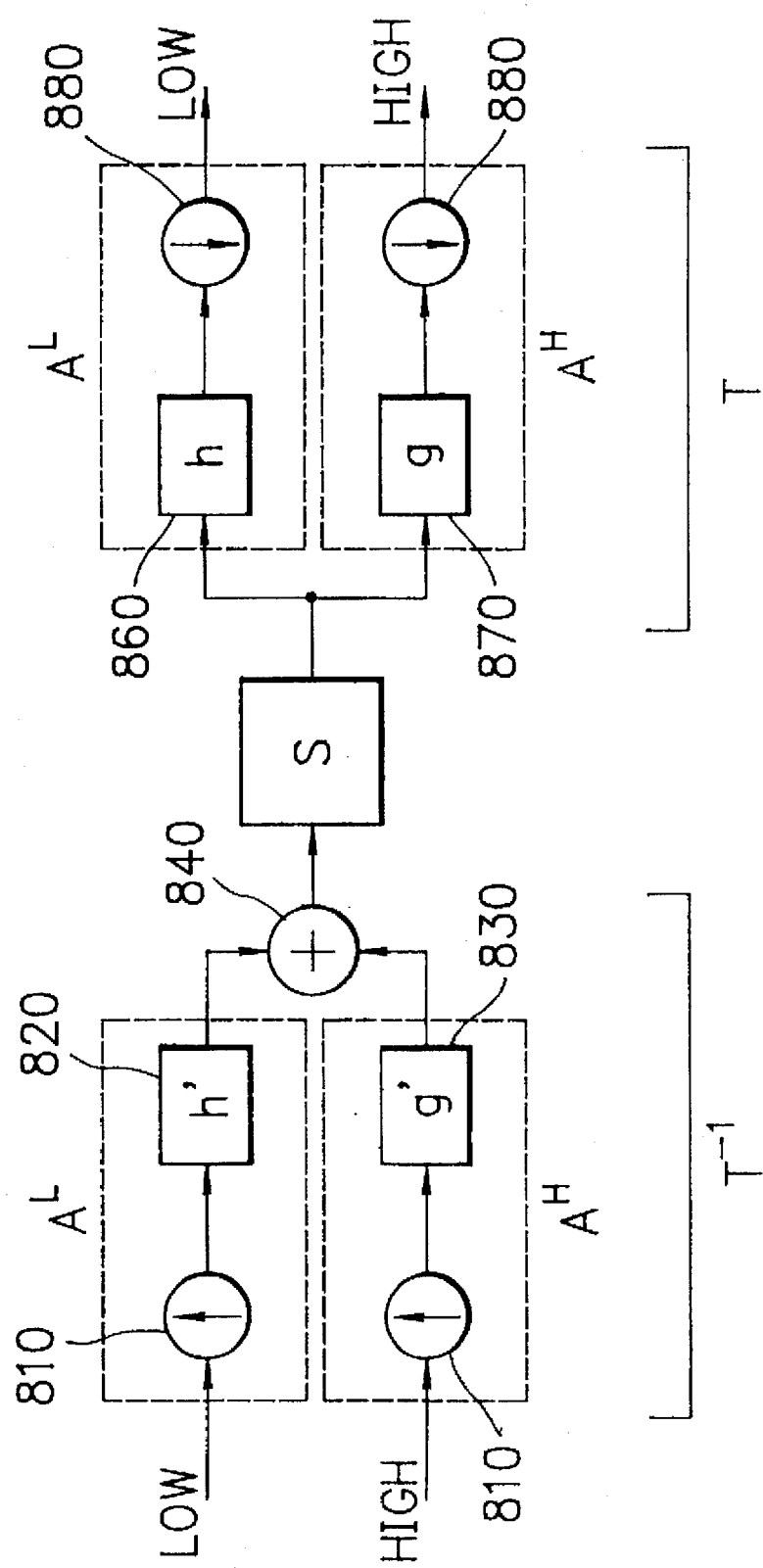
FIG. 5B is a block diagram of a conventional motion picture coding system.

FIG. 5B is a sub-band filter bank diagram representing the expression $T \cdot S \cdot T^{-1}$, where h' and h are low-pass filters on a synthesis side (inverse conversion side) and an analysis side (conversion side), respectively, and g' and g are high-pass filters on the synthesis side (inverse conversion side) and the analysis side (conversion side), respectively. Respective filters are of an FIR (finite-duration impulse-response) type.

As a CQF (conjugate quadrature filter) type filter bank is concerned, the filters h, g, h' and g' have their impulse responses such that:

$$\begin{aligned} h(i) & \quad (17)\\ g(i) &= (-1)^i \cdot h(1-i) \\ h'(i) &= h(-i) \\ g'(i) &= g(-i) \\ &= (-1)^i \cdot h(1+i) \end{aligned}$$

where i is a sample number. For each filter, its response is thus expressed by using an impulse response h(i) of the analyzing low-pass filter h.

As the transformation T has a unitarity (orthonormality), the response h(i) meets a necessary and sufficient condition such that:

$$\sum_i h(i)h(2k+i) = \delta(1k). \quad (18)$$

Figure 3:
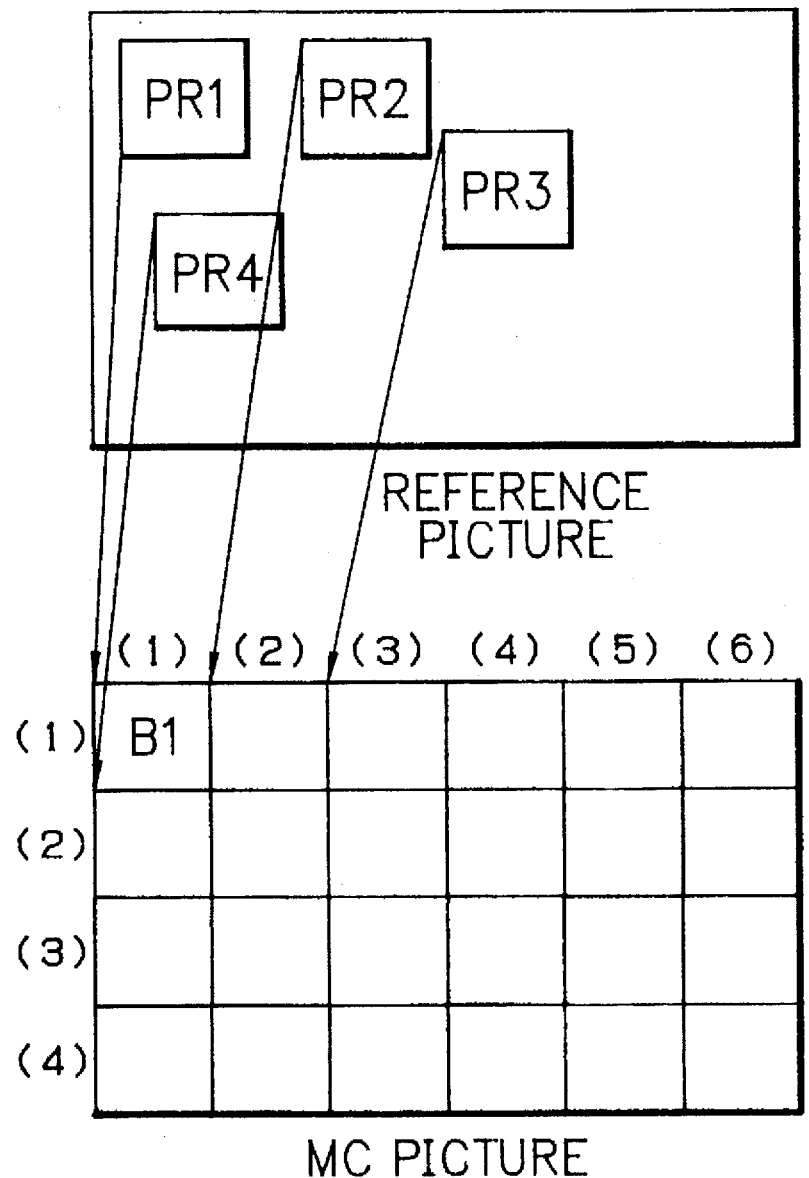
FIG. 3 is an illustration of a concept of a conventional block-level motion compensation.
Figure 4:
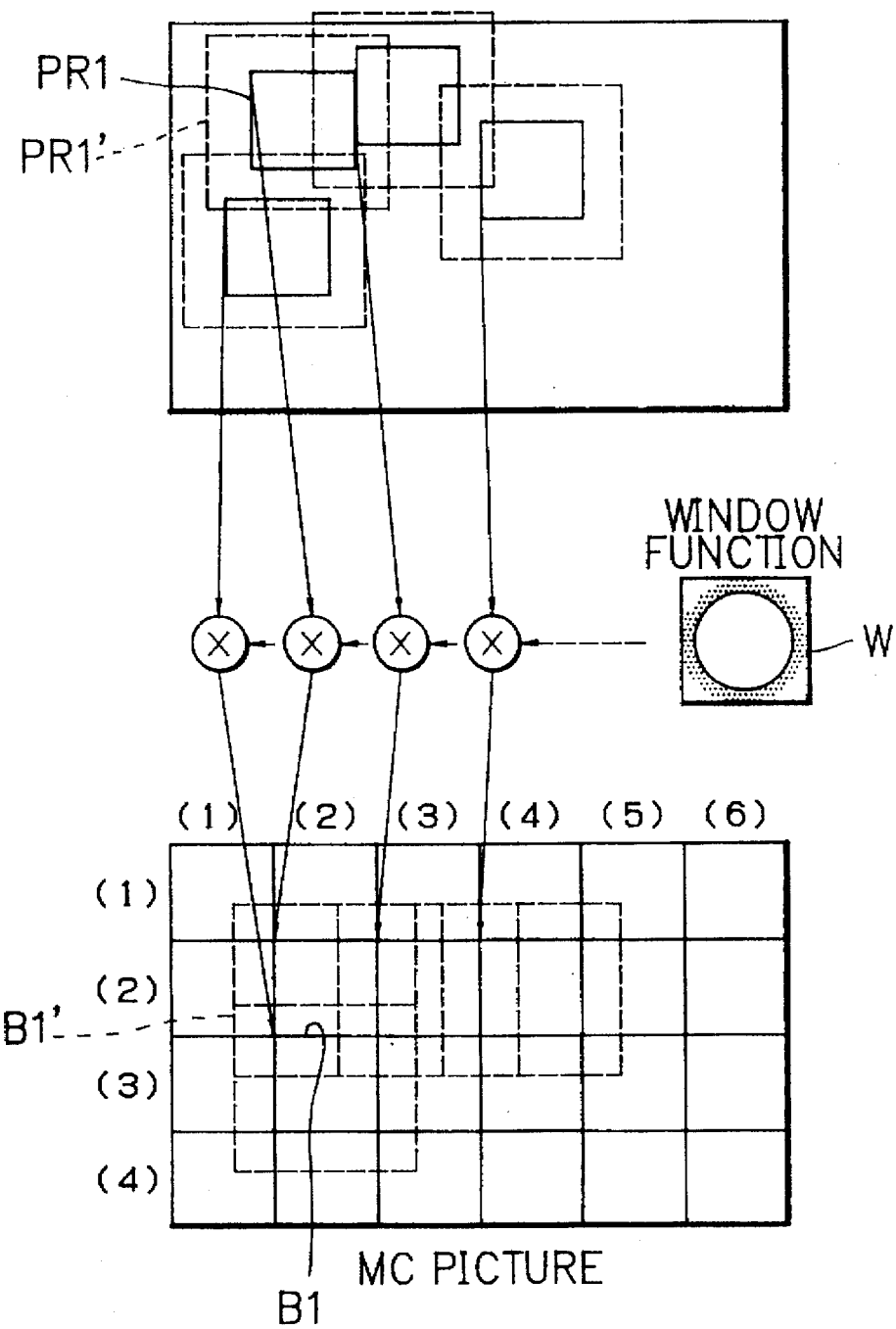
FIG. 4 is an illustration of a concept of a conventional motion compensation in which blocks overlap each other.

Up-samplers, down-samplers, filters and the shift S are all linear operators. In FIG. 3, designated by $A^L$ is a linear operator representative of a combination of up-sampler and low-pass filter, $A^H$ is a linear operator of a combination of up-sampler and high-pass filter, $A_L$ is a linear operator of a combination of down-sampler and low-pass filter, $A_H$ is a linear operator of a combination of down-sampler and high-pass filter.

The diagram of FIG. 5B can be deformed like FIG. 6 by moving an adder and introducing four linear operators such that:

$$\begin{aligned} A_L^L &= A_L \cdot S \cdot A^L \\ A_H^L &= A_H \cdot S \cdot A^L \end{aligned} \quad (19)$$

-continued $$A_L^H = A_L \cdot S \cdot A^H$$
$$A_H^L = A_H \cdot S \cdot A^H. \quad (19)$$

FIG. 6 means that the shift operation in the sub-band representation needs a number of intra-band linear operators $A_L^L$ and $A_H^H$ each completed within a corresponding sub-band and a number of inter-band linear operators $A_H^L$ and $A_L^H$ as cross terms between associated sub-bands.

If an ideal frequency division is performed, the cross terms are unnecessary, because the shift operation is inherently free from frequency. The frequency representation would have had no more shift operations than completed within associated sub-bands, unless the sub-bands intersect each other. However, in a practical operation in which any filter has a definite number of taps, it is impossible for the frequency division to be perfect. As a result, the cross terms are unavoidable.

The cross terms will be discussed hereinbelow in consideration of their magnitudes.

The linear operator $A^L$ can be reduced as follows:

$$x_L = (\ldots, x_L(-2), x_L(-1), x_L(0), x_L(1), x_L(2), \ldots)$$
$$\Downarrow \text{upsampling}$$
$$(\ldots, x_L(-2), 0, x_L(-1), 0, x_L(0), x_L(1), 0, x_L(2), \ldots)$$
$$\Downarrow \text{filtering}$$

$$x = \left( \ldots \sum_h x_L(k-1)h'(2k), \sum_h x_L(k-1)h'(2k-1), \right.$$
$$\left. \sum_h x_L(k)h'(2k), \sum_h x_L(k)h'(2k-1), \sum_h x_L(K+1)h'(2k), \ldots \right)$$

Using a matrix representation, it so follows that:

$$x = A^L \cdot (x_L)^t \quad (20),$$

$$A^L = \begin{pmatrix} 
 & \vdots & & & & & & \\
\ldots & h'(-3) & h'(-1) & h'(1) & h'(3) & h'(5) & \ldots & \\
\ldots & h'(-4) & h'(-2) & h'(0) & h'(2) & h'(4) & \ldots & \\
\ldots & & h'(-3) & h'(-1) & h'(1) & h'(3) & h'(5) & \ldots \\
\ldots & \ldots & h'(-4) & h'(-2) & h'(0) & h'(2) & h'(4) & \ldots & \ldots \\
 & & & h'(-3) & h'(-1) & h'(1) & h'(3) & h'(5) & \ldots \\
 & & \ldots & h'(-4) & h'(-2) & h'(0) & h'(2) & h'(4) & \ldots \\
 & & & & & \vdots & & 
\end{pmatrix} \quad (21)$$

Therefore, $$x(i) = \Sigma_j A^L(i,j) x_L(j) \quad (22)$$
$$= \Sigma_j h'(2j - i) x_L(j), \text{ and}$$

$$A^L(i,j) = h'(-i + 2j). \quad (23)$$

Likewise, for the operator $A^H$, $$A^H(i,j) = g'(-i + 2j). \quad (24)$$

Similarly, for the operator $A_L$, $$A_L = \begin{pmatrix}
 & \vdots & & & & & & \\
\ldots & h(-2) & h(-1) & h(0) & h(1) & h(2) & \ldots & \\
\ldots & \ldots & \ldots & h(-2) & h(-1) & h(0) & h(1) & h(2) & \ldots & \ldots & \ldots \\
 & & & \ldots & h(-2) & h(-1) & h(0) & h(1) & h(2) & \ldots \\
 & & & & & \vdots & & 
\end{pmatrix} \quad (25)$$

Therefore, it so follows that:

$$A_L(i,j) = h(-2i + j). \quad (26)$$

Likewise, for the operator $A_H$, $$A_H(i,j) = g(-2i + j). \quad (27)$$

Collecting them:

$$A^L(i,j) = h'(-i + 2j) \quad (28)$$

-continued $$A^H(i, j) = g'(-i + 2j)$$

$$A_L(i, j) = h(-2i + j)$$

$$A_H(i, j) = g(-2i + j).$$

On the other hand, for an n-th sample, the shift operation is given such that:

$$S_n(i,j) = \delta(i-j-n) \tag{29}$$

Accordingly, by using expression (17) to substitute h and g for h' and g', respectively, the linear operators $A_L^L$, $A_L^H$, $A_H^L$, $A_H^H$ can be reduced such that:

$$\begin{aligned}
A_L^L(i,j,n) &= \Sigma_k \Sigma_l A_L(i,k) S_n(k,l) A^L(l,j) \tag{30}\\
&= \Sigma_k \Sigma_l h(-2i+k) \delta(k-l-n) h'(-l+2j)\\
&= \Sigma_k h(-2i+k) h'(-k+n+2j)\\
&= \Sigma_k h(k-2i) h(k-n-2j)\\
&= \Sigma_k h(k) h(k-n+2(i-j))\\
A_H^L(i,j,n) &= \Sigma_k \Sigma_l A_H(i,k) S_n(k,l) A^L(l,j)\\
&= \Sigma_k g(k) h(k-n+2(i-j))\\
A_L^H(i,j,n) &= \Sigma_k \Sigma_l A_L(i,k) S_n(k,l) A^H(l,j)\\
&= \Sigma_k h(k) g(k-n+2(i-j))\\
A_H^H(i,j,n) &= \Sigma_k \Sigma_l A_H(i,k) S_n(k,l) A^H(l,j)\\
&= \Sigma_k g(k) g(k-n+2(i-j)).
\end{aligned}$$

Further, substituting h for g, $$\begin{aligned}
A_L^L(i,j,n) &= \Sigma_k h(k) h(k-n+2(i-j)) \tag{31}\\
A_H^L(i,j,n) &= \Sigma_k (-1)^k h(1-k) h(k-n+2(i-j))\\
&= \Sigma_k (-1)^k h(k) h(1-k-n+2(i-j))\\
A_L^H(i,j,n) &= \Sigma_k (-1)^{k-n} h(k) h(1-k+n-2(i-j))\\
&= (-1)^n \Sigma_k (-1)^k h(k) h(1-k+n-2(i-j))\\
A_H^H(i,j,n) &= \Sigma_k (-1)^{2k+n} h(1-k) h(1-k+n-2(i-j))\\
&= (-1)^n \Sigma_k h(k) h(k+n-2(i-j)).
\end{aligned}$$

It is important that if $n$ is an even number, then:

$$\begin{aligned}
A_L^L(i,j,n) &= \delta(-n+2(i-j)) \tag{32}\\
A_H^L(i,j,n) &= 0\\
A_L^H(i,j,n) &= 0\\
A_H^H(i,j,n) &= \delta(n-2(i-j)),
\end{aligned}$$

which will be seen from expression (18) for $A_L^L$ and $A_H^H$. For $A_L^H$ and $A_H^L$, a proof can be made. Therefore, if n is an even number, cross terms disappear, so that the shift operation in the sub-band representation is a mere combination of intra-band operations, as conventionally discussed.

Accordingly, the shift operation in the sub-band representation can be expressed such that:

$$x'_L(i) = \Sigma_j A_L^L x_L(i) + \Sigma_j A_L^H x_H(i) \tag{33}$$

$$x'_H(i) = \Sigma_j A_H^L x_L(i) + \Sigma_j A_H^H x_H(i). \tag{34}$$

where $x_H(i)$ and $x_L(i)$ are high-frequency and low-frequency sub-band signals, respectively, and $x'_H(i)$ and $x'_L(i)$ are corresponding signals after the shift operation.

There will be described below the block MC in which a picture is divided into blocks, a motion vector is defined every block and a motion compensation (spatial shift) also is effected every block.

A one-dimensional signal is now considered. Letting N be a block size and $v_0$ be a motion vector of a 0-th block in which $0 \leq i \leq N-1$, where i is a pixel number, an MC is defined on the 0-th block by a linear conversion such that:

$$\sum_j m(i,j,v_0) x(j). \tag{35}$$

Similar motion compensations are defined on respective blocks. The block MC of a motion picture is a total sum of such motion compensations to an input signal x(i).

Therefore, letting $v_n$ be a motion vector of an arbitrary n-th block in which $nN \leq i \leq nN+(N-1)$, and V be a set of motion vectors such that $V = \{v_n | n \in Z\}$, the block MC can be expressed as y(i) such that:

$$y(i) = \sum_n \left\{ \sum_j m(i-nN, j-nN, v_n) x(j) \right\}. \tag{36}$$

Introducing a generalized MC operator MC such that:

$$MC(i, j, V) = \sum_n m(i-nN, j-nN, v_n), \tag{37}$$

it so follows that:

$$y(i) = \sum_j MC(i, j, V) x(j), \tag{38}$$

which defines a generalized MC operation comprising the steps of:

(a) executing a linear conversion of a certain region of x(i);

(b) repeating the step (a) at intervals of N−1; and (c) superimposing results of such conversions to obtain y(i).

There will be discussed below the pixel value linear conversion operator $m(i,j, v_0)$ for the MC on the 0-th block, as the MC may be defined in various manners.

In the conventional discrete block MC, the motion compensation is a shift simply in blocks, so that:

$$\begin{aligned}
m(i,j,v_0) &= \delta(i-j-v_0) \quad 0 \leq i \leq N-1 \tag{39}\\
&= 0 \quad \text{for other } i
\end{aligned}$$

which can be expressed in a matrix such that:

$$m(i,j,v_0) = \begin{pmatrix} 0 & & 0 & & 0 \\ 1 & 0 & \cdots & & 0 \\ 0 & 1 & \cdots & & 0 \\ 0 & \cdot & \cdot & \cdot & 0 \\ & \cdot & & \cdot & \\ & \cdot & & \cdot & \\ 0 & 0 & \cdots & & 1 \\ 0 & & 0 & & 0 \end{pmatrix}. \tag{40}$$

In an overlap MC in which an object region is expanded outside a block and subjected to a window function before a shift, letting w(i) be the window function of e.g. a triangle window such that:

$$w(i) = \begin{cases} \frac{1}{N}\left(i + \frac{N+1}{2}\right) & -\frac{N}{2} \leq i \leq \frac{N}{2} - 1 \\ \frac{1}{N}\left(-i + \frac{3N-1}{2}\right) & \frac{N}{2} \leq i \leq \frac{3N}{2} - 1 \\ 0 & \text{for other } i \end{cases} \quad (41)$$

or of a cosine window such that:

$$w(i) = \quad (42)$$

$$\begin{cases} \frac{1}{2}\left(1 + \cos\left(\frac{\pi}{N}\left(i - \frac{N-1}{2}\right)\right)\right) & -\frac{N}{2} \leq i \leq \frac{3N}{2} - 1 \\ 0 & \text{for other } i \end{cases}$$

it so follows that:

$$m(i,j,v_0) = \begin{cases} w(i)\delta(i - j - v_0) & -\frac{N}{2} \leq i \leq \frac{3N}{2} - 1 \\ 0 & \text{for other } i \end{cases} \quad (43)$$

which can be expressed in a matrix form such that:

$$m(i,j,v_0) = \quad (44)$$

$$\begin{pmatrix} 0 & & & & 0 \\ w\left(-\frac{N}{2}\right) & 0 & & \cdots & 0 \\ 0 & w\left(-\frac{N}{2}+1\right) & & \cdots & 0 \\ 0 & \cdot & \cdot & & 0 \\ \cdot & & \cdot & & \\ \cdot & & & \cdot & \\ 0 & 0 & & \cdots & w\left(\frac{3N}{2}-1\right) \\ 0 & 0 & & & 0 \end{pmatrix}$$

In a fractional pel accuracy MC, letting $f_{v_0}$ be an interpolation filter, the conversion $m(i, j, v_0)$ can be expressed such that:

$$m(i,j,v_0) = \begin{cases} f_{v_0}(i-j) & 0 \leq i \leq N-1 \\ 0 & \text{for other } i \end{cases} \quad (45)$$

To this point, in a simplest case:

$$f_{0.5}(i) = 0.5 \quad i = 0, 1 \quad (46)$$
$$= 0 \quad \text{for other } i$$

In a general case in a matrix form:

$$m(i,j,v_0) = \begin{pmatrix} & & 0 & & & & \\ \cdots f_{v_0}(-1) & f_{v_0}(0) & f_{v_0}(1) & \cdots & \cdots & \cdots \\ & f_{v_0}(-1) & f_{v_0}(0) & f_{v_0}(1) & \cdots & \cdots \\ & & f_{v_0}(-1) & f_{v_0}(0) & f_{v_0}(1) & \cdots \\ & & & 0 & & \end{pmatrix} \quad (47)$$

The overlap MC may be combined with the fractional pel accuracy MC to provide a generalized block MC in a spatial representation, such that:

$$m(i,j,v_0) = w(i)f_{v_0}(i-j) \quad -\frac{N}{2} \leq i \leq \frac{3N}{2} - 1 \quad (48)$$
$$= 0 \quad \text{for other } i$$

or that: $m(i,j,v_O)$ $$= \begin{pmatrix} & & 0 & & & \\ \cdots w(-N/2)f_{v_0}(-1) & w(-N/2)f_{v_0}(0) & w(-N/2)f_{v_0}(1) & \cdots & \cdots \\ \cdots \cdots & w(-N/2+1)f_{v_0}(-1) & w(-N/2+1)f_{v_0}(0) & w(-N/2+1)f_{v_0}(1) & \cdots \\ \cdots \cdots & \cdots & \cdots & \cdots & \cdots \\ \cdots \cdots & \cdots & w(3N/2-1)f_{v_0}(-1) & w(3N/2-1)f_{v_0}(0) & \cdots \\ & & 0 & & \end{pmatrix} \quad (49)$$

There will be discussed below a variety of GMC (generalized MC)'s in a sub-band representation.

There are concluded various relationships from the foregoing expressions. For example, it is concluded from the expression (28) that:

$$A^L(i, j+k) = A^L(i - 2k, j) \quad (50)$$
$$A^H(i, j+k) = A^H(i - 2k, j)$$
$$A_L(i+k, j) = A_L(i, j - 2k)$$
$$A_H(i+k, j) = A_H(i, j - 2k).$$

By using such relationships, a signal conversion to be caused in a lower sub-band in correspondence to a full-band block MC can be calculated such that:

$$\Sigma_k \Sigma_l \Sigma_j A_L(i,k) MC(k,l,V) A^L(l,j) x_L(j) \quad (51)$$
$$= \Sigma_k \Sigma_l \Sigma_j \Sigma_n A_L(i,k) m(k - nN, l - nN, v_n) A^L(l,j) x_L(j)$$
$$= \Sigma_n \{\Sigma_j x_L(j) \{\Sigma_k \Sigma_l A_L(i,k) m(k - nN, l - nN, v_n) A^L(l,j)\}\}$$
$$= \Sigma_n \{\Sigma_j x_L(j) \{\Sigma_k \Sigma_l A_L(i,k + nN) m(k,l,v_n) A^L(l + nN, j)\}\}$$
$$= \Sigma_n \{\Sigma_j x_L(j) \{\Sigma_k \Sigma_l A_L(i - nN/2, k) m(k,l,v_n) A^L(l, j - nN/2)\}\}.$$

Thus, letting:

$$m_L(i,j,v_n) = \sum_k \sum_l A_L(i,k) m(k,l,v_n) A^L(l,j), \quad (52)$$

expression (51) can be expressed such that:

$$= \sum_n \left\{ \sum_j m_L(i - nN/2, j - nN/2, v_n) x_L(j) \right\}, \quad (53)$$

which represents an intra-subband GMC on the lower subband. As will be readily seen, this expression (53) corresponds to expression (36) of the GMC in the spatial representation. In the expression (53), a halved factor N/2 corresponds to a block size.

Likewise, an intra-subband GMC on a higher sub-band and cross terms GMC's between sub-bands can be expressed as follows:

$$m_L^H(i,j,v_n) = \sum_k \sum_l A_L(i,k)m(k,l,v_n)A^H(l,j), \quad (54)$$

$$m_H^L(i,j,v_n) = \sum_k \sum_l A_H(i,k)m(k,l,v_n)A^L(l,j), \quad (55)$$

$$m_H^H(i,j,v_n) = \sum_k \sum_l A_H(i,k)m(k,l,v_n)A^H(l,j). \quad (56)$$

Such GMC's can be combined to constitute other GMC's such that:

$$x'_L(i) = \sum_n \left\{ \sum_j m_L^L\left(i - \frac{nN}{2}, j - \frac{nN}{2}, v_n\right)x_L(j) \right\} + \quad (57)$$

$$\sum_n \left\{ \sum_j m_L^H\left(i - \frac{nN}{2}, j - \frac{nN}{2}, v_n\right)x_H(j) \right\},$$

$$x'_H(i) = \sum_n \left\{ \sum_j m_H^L\left(i - \frac{nN}{2}, j - \frac{nN}{2}, v_n\right)x_L(j) \right\} + \quad (58)$$

$$\sum_n \left\{ \sum_j m_H^H\left(i - \frac{nN}{2}, j - \frac{nN}{2}, v_n\right)x_H(j) \right\}.$$

In other words, letting L be a lower sub-band and H be a higher sub-band, the sub-band representation has four routes L→L, L→H, H→L, H→H to be taken into account along an MC. Four linear conversions corresponding thereto are superimposed to define the MC in the sub-band representation.

A simulation of discrete block MC was made for a block size of 16×16 on a full-band, i.e. 8×8 on each sub-band, using filters of a 16-tap QMF (quadrature miller filter) type. Motion vectors were represented by "0" for even-number pixels and "1" for odd-number pixels.

In the simulated MC, there were observed significant cross term signals even at even-number pixels, with increased significancies along block peripheries, which means relatively large distortions might have been caused therealong if no cross terms were considered. At odd-number pixels, remarkably significant cross term signals were observed as had been estimated.

Further, a simulation of overlap MC was made under similar conditions, using a triangle window.

In this simulation, cross term signals had substantially neglectible significancies at even-number pixels, and reduced significancies at odd-number pixels, proving a superiority of an overlap MC in sub-band representation.

There will be discussed below a two-dimensional signal $x(i_x, i_y)$ subjected to a two-dimensional MC in a two-dimensional sub-band representation.

A horizontal-vertical separative two-dimensional sub-band representation is now assumed for a sub-band analysis, such that:

$$X_{LL}(i_x, i_y) = \Sigma_{j_x}\Sigma_{j_y}A_L(i_x, j_x)A_L(i_y, j_y)x(j_x, j_y) \quad (59)$$

$$X_{HL}(i_x, i_y) = \Sigma_{j_x}\Sigma_{j_y}A_H(i_x, j_x)A_L(i_y, j_y)x(j_x, j_y)$$

$$X_{LH}(i_x, i_y) = \Sigma_{j_x}\Sigma_{j_y}A_L(i_x, j_x)A_H(i_y, j_y)x(j_x, j_y)$$

$$X_{HH}(i_x, i_y) = \Sigma_{j_x}\Sigma_{j_y}A_H(i_x, j_x)A_H(i_y, j_y)x(j_x, j_y),$$

and for a sub-band synthesis, such that:

$$x(i_x, i_y) = \Sigma_{j_x}\Sigma_{j_y}A^L(i_x, j_x)A^L(i_y, j_y)x_{LL}(j_x, j_y) + \quad (60)$$

$$\Sigma_{j_x}\Sigma_{j_y}A^H(i_x, j_x)A^L(i_y, j_y)x_{HL}(j_x, j_y) +$$

$$\Sigma_{j_x}\Sigma_{j_y}A^L(i_x, j_x)A^H(i_y, j_y)x_{LH}(j_x, j_y) +$$

$$\Sigma_{j_x}\Sigma_{j_y}A^H(i_x, j_x)A^H(i_y, j_y)x_{HH}(j_x, j_y).$$

The two-dimensional MC can be expressed by using a dimensionally adapted operator $m2(i_x, i_y, j_x, j_y, v_{nx}, v_{ny})$, such that:

$$x'(i) = \sum_{nx\,ny} \left\{ \sum_{jx\,jy} m2(i_x - n_xN, i_y - \quad (61) \right.$$

$$\left. n_yN, j_x - n_xN, j_y - n_yN, v_{nx}, v_{ny})x(j_x, j_y) \right\},$$

which is horizontal-vertical separative such that:

$$x'(i) = \sum_{nx\,ny} \left\{ \sum_{jx\,jy} m(i_x - n_xN, j_x - \quad (62) \right.$$

$$\left. n_xN, v_{nx})m(i_y - n_yN, j_y - n_yN, v_{ny})x(j_x, j_y) \right\}.$$

Like the one-dimensional case, there occurs a signal conversion in a low region, such that:

$$\Sigma_{k_x,k_y}\Sigma_{l_x,l_y}\Sigma_{j_x,j_y}\Sigma_{nx,ny} \quad (63)$$

$$A_L(i_x,k_x)A_L(i_y,k_y)m(k_x - n_xN,l_x - n_xN,v_{nx})m(k_y -$$

$$n_yN,l_y - n_yN,v_{ny})A^L(l_x,j_x)A^L(l_y,j_y)x_{LL}(j_x,j_y)$$

$$= \Sigma_{nx,ny}\Sigma_{jx,jy}$$

$$\{\Sigma_{k_x}\Sigma_{l_x}A_L(i_x,k_x)m(k_x - n_xN,l_x - n_xN,v_{nx})A^L(l_x,j_x)\}$$

$$\{\Sigma_{k_y}\Sigma_{l_y}A_L(i_y,k_y)m(k_y - n_yN,l_y - n_yN,v_{ny})A^L(l_y,j_y)\}x_{LL}(j_x,j_y)$$

$$= \Sigma_{nx,ny}\Sigma_{jx,jy}m_L^L(i_x - n_xN,j_x - n_xN,v_{nx})m_L^L(i_y -$$

$$n_yN,j_y - n_yN,v_{ny})x_{LL}(j_x,j_y).$$

In the two-dimensional case, a total of sixteen conversions are associated, including cross terms. By using them, the two-dimensional MC in sub-band representation can be expressed such that:

$$x'_{LL}(i_x,i_y) = \Sigma_{jx}\Sigma_{jy}\Sigma_{nx}\Sigma_{ny}m_L^L(i_x - n_xN,j_x - n_xN,v_{nx})m_L^L(i_y - n_yN,j_y - n_yN,v_{ny})x_{LL}(j_x,j_y) +$$

$$\Sigma_{jx}\Sigma_{jy}\Sigma_{nx}\Sigma_{ny}m_L^L(i_x - n_xN,j_x - n_xN,v_{nx})m_L^H(i_y - n_yN,j_y - n_yN,v_{ny})x_{LH}(j_x,j_y) +$$

$$\Sigma_{jx}\Sigma_{jy}\Sigma_{nx}\Sigma_{ny}m_L^H(i_x - n_xN,j_x - n_xN,v_{nx})m_L^L(i_y - n_yN,j_y - n_yN,v_{ny})x_{HL}(j_x,j_y) +$$

$$\Sigma_{jx}\Sigma_{jy}\Sigma_{nx}\Sigma_{ny}m_L^H(i_x - n_xN,j_x - n_xN,v_{nx})m_L^H(i_y - n_yN,j_y - n_yN,v_{ny})x_{HH}(j_x,j_y)$$

-continued $$x'_{LH}(i_x,i_y) = \Sigma_{jx}\Sigma_{jy}\Sigma_{nx}\Sigma_{ny}m_L^L(i_x - n_xN,j_x - n_xN,v_{nx})m_H^L(i_y - n_yN,j_y - n_yN,v_{ny})x_{LL}(j_x,j_y) +$$

$$\Sigma_{jx}\Sigma_{jy}\Sigma_{nx}\Sigma_{ny}m_L^L(i_x - n_xN,j_x - n_xN,v_{nx})m_H^H(i_y - n_yN,j_y - n_yN,v_{ny})x_{LH}(j_x,j_y) +$$

$$\Sigma_{jx}\Sigma_{jy}\Sigma_{nx}\Sigma_{ny}m_L^H(i_x - n_xN,j_x - n_xN,v_{nx})m_H^L(i_y - n_yN,j_y - n_yN,v_{ny})x_{HL}(j_x,j_y) +$$

$$\Sigma_{jx}\Sigma_{jy}\Sigma_{nx}\Sigma_{ny}m_L^H(i_x - n_xN,j_x - n_xN,v_{nx})m_H^H(i_y - n_yN,j_y - n_yN,v_{ny})x_{HH}(j_x,j_y)$$

$$x'_{HL}(i_x,i_y) = \Sigma_{jx}\Sigma_{jy}\Sigma_{nx}\Sigma_{ny}m_H^L(i_x - n_xN,j_x - n_xN,v_{nx})m_L^L(i_y - n_yN,j_y - n_yN,v_{ny})x_{LL}(j_x,j_y) +$$

$$\Sigma_{jx}\Sigma_{jy}\Sigma_{nx}\Sigma_{ny}m_H^L(i_x - n_xN,j_x - n_xN,v_{nx})m_L^H(i_y - n_yN,j_y - n_yN,v_{ny})x_{LH}(j_x,j_y) +$$

$$\Sigma_{jx}\Sigma_{jy}\Sigma_{nx}\Sigma_{ny}m_H^H(i_x - n_xN,j_x - n_xN,v_{nx})m_L^L(i_y - n_yN,j_y - n_yN,v_{ny})x_{HL}(j_x,j_y) +$$

$$\Sigma_{jx}\Sigma_{jy}\Sigma_{nx}\Sigma_{ny}m_H^H(i_x - n_xN,j_x - n_xN,v_{nx})m_L^H(i_y - n_yN,j_y - n_yN,v_{ny})x_{HH}(j_x,j_y)$$

$$x'_{HH}(i_x,i_y) = \Sigma_{jx}\Sigma_{jy}\Sigma_{nx}\Sigma_{ny}m_H^L(i_x - n_xN,j_x - n_xN,v_{nx})m_L^L(i_y - n_yN,j_y - n_yN,v_{ny})x_{LL}(j_x,j_y) +$$

$$\Sigma_{jx}\Sigma_{jy}\Sigma_{nx}\Sigma_{ny}m_H^L(i_x - n_xN,j_x - n_xN,v_{nx})m_H^H(i_y - n_yN,j_y - n_yN,v_{ny})x_{LH}(j_x,j_y) +$$

$$\Sigma_{jx}\Sigma_{jy}\Sigma_{nx}\Sigma_{ny}m_H^H(i_x - n_xN,j_x - n_xN,v_{nx})m_H^L(i_y - n_yN,j_y - n_yN,v_{ny})x_{HL}(j_x,j_y) +$$

$$\Sigma_{jx}\Sigma_{jy}\Sigma_{nx}\Sigma_{ny}m_H^H(i_x - n_xN,j_x - n_xN,v_{nx})m_H^H(i_y - n_yN,j_y - n_yN,v_{ny})x_{HH}(j_x,j_y)$$

By employing abbreviated forms, such as:

$m_H^H(x)$ for $m_H^H(i_x-n_xN, j_x-n_xN, v_{nx})$ and $m_H^H(y)$ for $m_H^H(i_y-n_yN, j_y-n_yN, v_{ny})$, it so follows that:

$$x'_{LL}(i_x,i_y) = \Sigma_{jy}\Sigma_{ny}m_L^L(y)(\Sigma_{jx}\Sigma_{nx}m_L^L(x)x_{LL}(j_x,j_y) +$$

$$\Sigma_{jx}\Sigma_{nx}m_L^H(x)x_{HL}(j_x,j_y)) +$$

$$\Sigma_{jy}\Sigma_{ny}m_L^H(y)(\Sigma_{jx}\Sigma_{nx}m_L^L(x)x_{LH}(j_x,j_y) +$$

$$\Sigma_{jx}\Sigma_{nx}m_L^H(x)x_{HH}(j_x,j_y))$$

$$x'_{LH}(i_x,i_y) = \Sigma_{jy}\Sigma_{ny}m_H^L(y)(\Sigma_{jx}\Sigma_{nx}m_L^L(x)x_{LL}(j_x,j_y) +$$

$$\Sigma_{jx}\Sigma_{nx}m_L^H(x)x_{HL}(j_x,j_y)) +$$

$$\Sigma_{jy}\Sigma_{ny}m_H^H(y)(\Sigma_{jx}\Sigma_{nx}m_L^L(x)x_{LH}(j_x,j_y) +$$

$$\Sigma_{jx}\Sigma_{nx}m_L^H(x)x_{HH}(j_x,j_y))$$

$$x'_{HL}(i_x,i_y) = \Sigma_{jy}\Sigma_{ny}m_L^L(y)(\Sigma_{jx}\Sigma_{nx}m_H^L(x)x_{LL}(j_x,j_y) +$$

$$\Sigma_{jx}\Sigma_{nx}m_H^H(x)x_{HL}(j_x,j_y)) +$$

$$\Sigma_{jy}\Sigma_{ny}m_L^H(y)(\Sigma_{jx}\Sigma_{nx}m_H^L(x)x_{LH}(j_x,j_y) +$$

$$\Sigma_{jx}\Sigma_{nx}m_H^H(x)x_{HH}(j_x,j_y))$$

$$x'_{HH}(i_x,i_y) = \Sigma_{jy}\Sigma_{ny}m_H^L(y)(\Sigma_{jx}\Sigma_{nx}m_H^L(x)x_{LL}(j_x,j_y) +$$

$$\Sigma_{jx}\Sigma_{nx}m_H^H(x)x_{HL}(j_x,j_y)) +$$

$$\Sigma_{jy}\Sigma_{ny}m_H^H(y)(\Sigma_{jx}\Sigma_{nx}m_H^L(x)x_{LH}(j_x,j_y) +$$

$$\Sigma_{jx}\Sigma_{nx}m_H^H(x)x_{HH}(j_x,j_y))$$

The foregoing discussions were proven by the following simulations.

First, motion vectors were determined at integral pixels on a full-band, and were employed for a full-band MC and a sub-band GMC in consideration of cross terms, with their results completely identical.

Then, a power comparison was made among respective prediction error signals of: a perfect MC on sub-bands in consideration of cross terms; a half-pel MC on sub-bands with cross term filters cut; and an integral MC on sub-bands, as it was simplified to a pel accuracy. Employed sub-band filters were Daubechies' 4-tap and 8-tap and QMF 16-tap. Results of comparison between a full-band block MC and an overlap MC showed that: kinds of filters have no significant influences; a perfect MC has a coding efficiency higher in gain by 2 dB or more than an integral MC on sub-bands, as cross terms are taken into account; a difference of 1 dB or less develops, with and without cross terms; and an overlap MC is always effective.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A system for a motion compensation on sub-band signals, the system comprising:

linear conversion coefficient determiner means responsive to digital signals provided with motion vectors of a plurality of regions to determine a linear conversion coefficient for a respective one of the motion vectors in accordance with the respective motion vector and a shape of a corresponding one of the regions on which the respective motion vector represents a motion;

linear conversion means for performing linear conversions of the digital signals by using the respective coefficients of the motion vectors; and accumulation means for accumulating results of the conversions for the respective motion vector by the linear conversion means so that the linear conversions are overlapped with each other.

2. A system for motion compensation on sub-band signals, the system comprising:

first linear conversion coefficient determiner means responsive to digital signals provided with motion vectors of a plurality of regions and with said digital signals being divided into a total of N sub-bands, where N is an integer larger than one, to determine a linear conversion coefficient in a respective one of the N sub-bands for a respective one of the motion vectors and a signal on the respective sub-band in accordance with the respective motion vector and a shape of a corresponding one of the regions on which the respective motion vector represents a motion;

second linear conversion coefficient determiner means for determining linear conversion coefficients between sub-bands for a total of N−1 sub-band signals different from the signal on the respective motion vector and the shape of the corresponding region on which the respective motion vector represents the motion, for the respective motion vector and the signal on the respective sub-band;

first linear conversion means for performing an intra-band linear conversion by the linear conversion coefficient in the respective sub-band for the respective motion vector and the respective one of the N sub-bands, the intra-band linear conversion being performed solely within the respective one of the N sub-bands;

second linear conversion means for performing inter-band linear conversions by the linear conversion coefficients between the N−1 sub-bands for the respective motion vector and the respective one of the N sub-bands, the N−1 sub-bands being different sub-bands than the respective one of the N sub-bands, the inter-band linear conversions being performed between bands of the N sub-bands; and accumulation means for accumulating a result of the intra-band linear conversion of the first linear conversion means and results of the inter-band linear conversions of the second linear conversion means.

3. A system according to claim 2, wherein an accumulation of a predetermined one of the results of the inter-band linear conversions of the second linear conversion means is omitted.

4. A method for a motion compensation on sub-band signals, the method comprising the steps of:

a linear conversion coefficient determining step of being responsible for digital signals provided with motion vectors of a plurality of regions to determine a conversion coefficient for a respective one of the motion vectors in accordance with the respective motion vector and a shape of a corresponding one of the regions on which the respective motion vector represents a motion;

a linear conversion step of performing linear conversions of the digital signals by using the respective coefficients of the motion vectors; and an accumulation step of accumulating results of the conversions for the respective motion vector by the linear conversion step so that the linear conversions are overlapped with each other.

5. A motion compensation system, comprising:

a linear converter configured to receive an input signal, to perform a linear conversion on the input signal, and to output a linearly-transformed signal as a result thereof, the input signal being divided into a plurality of blocks defining predetermined, separate regions of a picture corresponding to the input signal, each block of the input signal having a motion vector assigned thereto for defining a motion for the corresponding block;

an accumulator connected to receive the linearly-transformed signal from the linear converter and to accumulate the linearly-transformed signal with other linearly-transformed signals previously output by the linear converter; and a linear conversion coefficient determiner configured to receive the motion vector for each block of the input signal and a position and a shape of each block with respect to the other blocks of the input signal, the linear conversion coefficient determiner configured to output a coefficient value to the linear converter, the coefficient value being used by the linear converter to perform the linear conversion on the input signal.

* * * * *